United States Patent [19]

Mann et al.

[11] 4,342,599

[45] Aug. 3, 1982

[54] METHOD OF REDUCING WATER DEMAND OF ALKALINE AQUEOUS SUSPENSIONS

[75] Inventors: William F. Mann, Westfield; Thomas J. Smith, Springfield, both of N.J.

[73] Assignee: Colloids, Inc., Newark, N.J.

[21] Appl. No.: 245,036

[22] Filed: Mar. 18, 1981

[51] Int. Cl.$^3$ .............................................. C04B 7/02
[52] U.S. Cl. .................................................. 106/100
[58] Field of Search ................................ 106/100, 103

[56] References Cited

U.S. PATENT DOCUMENTS 2,790,725  4/1957  Williams .............................. 106/100
2,905,565  9/1959  Dietz et al. .......................... 106/100
4,175,975  11/1979  MacWilliams ....................... 106/100

Primary Examiner—James Poer
Attorney, Agent, or Firm—Ostrolenk, Faber, Gerb & Soffen

[57] ABSTRACT

This invention relates to the reduction of water demand in alkaline aqueous suspensions containing free cations, particularly in the wet process production of Portland cement and more specifically to the use of carbon dioxide and anionic polymer dispersants to realize such a water demand reduction. The combination of the carbon dioxide and anionic polymer dispersant is synergistic and the combination effectively reduces the water demand of the suspended solids at concentrations where neither additive alone is effective.

19 Claims, No Drawings

4,342,599

METHOD OF REDUCING WATER DEMAND OF ALKALINE AQUEOUS SUSPENSIONS

BACKGROUND OF THE INVENTION

In the wet process for making Portland cement, the raw materials include such ingredients such as limestone, dolomite, oyster shells, glass furnace slag and other well known high calcium containing products are mixed with silicious materials including slag, clay, shale or other silica containing ingredients and with various aluminum containing and iron containing compounds. The mixture of raw ingredients, using well known process steps, is ground with the addition of water to prepare an aqueous kiln feed slurry which is screened and then pumped into storage tanks preparatory to further blending with other slurries or feeding to a clinkering kiln. Such slurries usually contain from 30–50% by weight of water.

In the kiln, the aqueous slurry is dried and calcined to form a clinker which is then ground to make Portland cement. The water demand of the finely ground limestone-clay slurry is fairly high because large amounts of water are necessary to realize a fluid, pumpable slurry. This limits the rate at which the slurry can be processed and fed to the kiln and it also requires a larger fuel input to effect drying and calcining any given quantity of solids to the clinker stage.

Many substances with dispersant activity have been tried as agents to decrease the water demand of suspended inorganic solids in various high solids water suspensions or slurries for various applications but have proven relatively ineffective or undesirable in the wet process for making Portland cement. Complex phosphates are undesirable because they hydrolyze at the temperature developed during grinding and in storage and because the residual phosphate has an adverse effect on the properties of the final Portland cement product. Lignosulfonates alone or in combination with inorganic salt dispersants require high addition levels for only marginal improvement and also rapidly loose activity during slurry storage. Many other materials are too expensive to be economically utilized in such operations.

U.S. Pat. No. 4,175,975 teaches that the water demand of the slurry can be significantly reduced if a polyacrylic acid salt having a molecular weight of 2,000–50,000 is used in combination with the alkali metal salts of carbonates, bicarbonates, silicates, oxalates, aluminates and borates and ammonium salts of carbonates, bicarbonates, oxalates and borates which form insoluble salts with calcium. Even so, it is desirable to reduce water demand even further, to be able to use a larger variety of dispersants and to be able to more economically reduce water demand.

It has now been found that further improvements in reducing water demand can economically be achieved if any anionic polymer dispersant is added to the slurry at a basic pH provided that the slurry has been treated with carbon dioxide to bind the free cations forming insoluble carbonates in the slurry. Low cost carbon dioxide sources are readily available at wet process plants, a fact which is highly advantageous to the overall economics of the Portland cement production. Also, in addition to the ability to select among numerous anionic polymer dispersants, the amount of dispersant required to realize any given viscosity is generally less than required in said U.S. Pat. No. 4,175,975 which results in further economic advantages. The combination of the carbon dioxide and anionic polymer dispersant is synergistic to a high degree.

SUMMARY OF THE INVENTION

This invention relates to the reduction of water demand in alkaline aqueous suspensions containing free cations, particularly in the wet process production of Portland cement and more specifically to the use of carbon dioxide and anionic polymer dispersants to realize such a water demand reduction. The combination of the carbon dioxide and anionic polymer dispersant is synergistic and the combination effectively reduces the water demand of the suspended solids at concentrations where neither additive alone is effective.

DESCRIPTION OF THE INVENTION

In accordance with the present invention, the aqueous limestone-clay slurry is prepared in the conventional manner except that the amount of water used to form the slurry is reduced. The amount of water reduction possible is a function of the amount of carbon dioxide and the amount of anionic polymer dispersant used and the interrelationship of these three factors determines the viscosity of the pumpable slurry. The amount of water reduction for any given amount of carbon dioxide and anionic polymer dispersant can readily be determined by a few simple experiments. As a general rule, by means of the present invention, the amount of water will be about 20–40% of the slurry.

Carbon dioxide is added to the aqueous slurry. The carbon dioxide can be in any convenient form ranging from the pure gas to gas mixtures containing $CO_2$. One particularly convenient source of $CO_2$ is flue gas which is usually present in adequate quantities at a wet process cement manufacturing installation. The slurries are usually mildly agitated by ebullition with compressed air. It is therefore particularly convenient to replace or augment such compressed air with flue gas which not only utilizes a waste product of the installation but also results in economies because less or no compressed air need be used. In addition, ebullition with flue gas in a dispersed system helps to prevent degradation of viscosity upon aging and assists in maintaining the slurry at an elevated temperature which reduces input energy requirements upon the subsequent calcining of the raw materials. It will be appreciated that while kiln off gases have heretofor been used for heat exchange purposes in the dry process of producing cement (see, e.g., U.S. Pat. No. 4,126,471), such gases are highly acidic and can provide the $CO_2$ used in the present invention.

The carbon dioxide is added to the slurry in an amount sufficient to bind free cations therein which form insoluble carbonates. Without wishing to be limited to theory, it is presently believed that the reason that anionic polymer dispersants have been ineffective in the past is that they become precipitated or otherwise bound to those cations generally responsible for making water hard, i.e., principally calcium and magnesium, and are thereby prevented from operating as dispersants and lowering viscosity. The amount of carbon dioxide necessary will vary greatly from slurry to slurry depending on the particular raw materials which are combined to form that slurry. Very generally, amounts of carbon dioxide from about 0.02 to about 0.25 wt.% based on the weight of the slurry solids and usually about 0.05–0.15 wt.%, will be employed. It is particularly convenient to regulate the amount of carbon dioxide added by monitoring the pH of the aqueous slurry. The initial carbon dioxide added will form insoluble carbonates with the calcium, magnesium, etc. in the slurry and when such free cations have been removed from the system, the carbon dioxide will dissolve in the water forming carbonic acid and thereby lower the pH of the system. Accordingly, when the pH of the aqueous slurry begins to drop toward acid values, a sufficient amount of carbon dioxide has been added.

The anionic polymer dispersants which are used in the process of this invention are effective when the slurry is at a pH greater than 7.0. Depending on the particular raw materials mixed to form the slurry and the amount of carbon dioxide introduced into the slurry, the pH may have dropped to 7.0 or less. In such event, a suitable base is added to the slurry to raise the pH to above 7.0. The addition of the base can take place either simultaneously with the addition of the carbon dioxide but is preferably prior thereto. Because of its low cost and availability, caustic soda is a preferred base but other bases can be used if desired.

Any conventional anionic polymer dispersant can be used in the next step of the invention. Such dispersants include the lignosulfonates, sodium formaldehyde sulfonates, and acrylic polyelectrolytes as well as other anionic polymer dispersants. It is presently preferred to employ the acrylic polymer polyelectrolytes and the salts thereof as the dispersant. The acrylic polymer polyelectrolytes generally have an average molecular weight which is in range of from about 500 to about 50,000 and preferably have a molecular weight of less than 2,000 when measured by vapor phase osmometric and membrane osmometric analysis. Such polymers generally have a viscosity from about 10 to about 150, preferably about 20–40, centipoises at 30% by weight solids.

The acrylic polymer polyelectrolytes can be homopolymers of acrylic acid or methacrylic acid or copolymers of such acids with up to about 30% of a copolymerizable monomer such as acrylamide, acrylonitrile, methyl acrylate, ethyl acrylate, methyl methacrylate, ethyl methacrylate, hydroxy-ethyl methacrylate, etc. Various methods of preparing such polymers are known in the art and do not constitute a part of the present invention. It is most convenient to employ the acrylic acid polymer in the form of a water soluble salt thereof dissolved in water. In most cases, the sodium salt will be used, but if desired, other alkali metal salts such as potassium, or ammonium salts can be employed. Also if desired, various mixtures of the anionic polymer dispersants can be utilized.

The amount of anionic polymer dispersants utilized will vary considerably depending on the particular raw materials used in preparing the aqueous slurry, the water content of the slurry, the amount of carbon dioxide utilized and the like. Since the object of adding the dispersant is to realize a pumpable slurry at the given water content being employed, an amount of dispersant is added which is sufficient to adjust the viscosity of the slurry to such a condition. In most cases, slurries having a viscosity of about 2,000–12,000 centipoises, preferably about 4,000–6,000 centipoises, are desired. Accordingly, the amount of dispersant added is that sufficient to realize such a centipoise value. When the dispersant is a polyacrylic acid sodium salt having an average molecular weight of less than 2,000, it has generally been found that concentrations of from about 0.005 to 0.2 wt.% based on the slurry solids is sufficient and usually an amount of 0.01–0.1 will be used. The anionic polymer dispersant is added to the aqueous slurry in any convenient manner and at any convenient temperature.

In order to further illustrate the present invention, various non-limiting examples are set forth below. It will be appreciated that, unless otherwise indicated, all parts and percentages throughout this specification and claims are by weight and all temperatures are set forth in degrees Celcius.

EXAMPLE 1

A commercial Portland cement aqueous slurry was obtained and concentrated from a solids content of 58.7% solids to 72.4% solids. As a result of such water reduction, the viscosity of the slurry increased from 6100 centipoises to 37,500 centipoises. The slurry contained on a dry basis, 1.8 parts iron calcine, 31.4 parts dry rock, 47.1 parts of 80% rock slurry and 19.7 part of 43% clay slurry. The concentrated slurry had a pH of 7.3.

Carbon dioxide was ebullited through the slurry at the rate of 1 SCFH for 15 minutes which resulted in the pH dropping to 6.0. 1 ml of 50% caustic soda was then added which raised the pH to 7.3. Carbon dioxide was added to the slurry for an additional 1.5 minutes at 1 SCFH which reduced the pH to 6.3, and then an additional 1 ml of 50% caustic soda was added which brought the pH to 7.5. Two pounds of a polyacrylic acid sodium salt having an average molecular weight of about 1,000 were added per dry ton of the slurry. The viscosity after completion of the $CO_2$ addition had risen to 44,000 cps and after addition of the anionic polymer dispersant dropped to 5100 cps. The pH was 8.5. The viscosity and pH were redetermined three days later and found to be 5,000 cps and 8.3.

EXAMPLE 2

In order to compare and contrast the procedure of the present invention with that described in U.S. Pat. No. 4,175,975, Example 1 was followed using carbon dioxide in one case and an equivalent amount of soda ash in the other sand using the same polyacrylic acid anionic polymer dispersant in both procedures. The viscosity of the slurry and pH were measured and are set forth in the following table. For comparison, the slurry before addition of the carbon dioxide or soda ash had a viscosity of 37,500 and a pH of 7.3.

TABLE I

| After Addition of | Soda Ash Viscosity cps | pH | Invention Viscosity cps | pH |
|---|---|---|---|---|
| soda ash or $CO_2$ | 47,000 | 8.05 | 44,000 | 7.5 |
| soda ash or $CO_2$ plus 1.6 lbs/dry ton polyacrylic acid Na salt | 15,000 | 8.55 | 8,700 | 8.25 |
| soda ash or $CO_2$ plus 2 lbs/dry$^2$ ton polyacrylic acid Na salt | 8,700 | 8.70 | 5,100 | 8.5 |

The foregoing Table shows that the carbon dioxide-polyacrylic acid combination is much more effective in reducing water demand than the soda ash-polyacrylic acid combination. Thus, it required an additional 0.4 lbs/dry ton of dispersant (i.e., 25% or more) when soda ash was used to realize the same degree of water demand reduction as measured by viscosity.

EXAMPLE 3

A commercial Portland cement aqueous slurry having a solids concentration of 53.4%, a viscosity of 9200 centipoises and a pH of 7.5 was concentrated to a solids concentration of 63.6% (that is, a 10% reduction in the amount of water) which resulted in the viscosity increasing to 19,000 cps. Following the procedure of Example 1, 0.5 wt.% $CO_2$ based on the solids of the slurry and 0.03375 of the same polyacrylic acid were added. The resulting slurry had a viscosity of 12,000 cps.

A repetition of the procedure additionally employing 0.75 wt.% of caustic soda resulted in a slurry having a pH of 7.1 and a viscosity of 9,000 centipoises.

EXAMPLE 4

Example 1 was repeated except that the dispersant employed was the sodium salt of a polyacrylic acid having an average molecular weight of about 1100 and a viscosity of about 30 cps.

EXAMPLE 5

Example 1 was repeated except that the dispersant employed was sodium naphthalene formaldehyde sulfonate.

Various changes and modifications can be made in the process and products of this invention without departing from the spirit and scope thereof. The various embodiments that have been disclosed herein were for the purpose of further illustrating the invention but were not intended to limit it.

We claim:

1. In the wet process for the production of cement solids wherein limestone and clay are ground in the presence of water to form a pumpable kiln feed slurry, the improvement which comprises adding to said slurry an amount of carbon dioxide sufficient to bind free cations forming insoluble carbonates therein and adding to the resulting slurry at a pH greater than 7.0, an amount of anionic polymer dispersant to adjust the viscosity of said slurry to a value suitable for pumping.

2. The process of claim 1 wherein said dispersant is added in an amount sufficient to reduce the viscosity of said slurry to about 4,000–6,000 cps.

3. The process of claim 2 wherein about 0.02 to 0.25 weight percent of carbon dioxide is added based on the weight of the slurry solids.

4. The process of claim 3 wherein about 0.05 to 0.15 wt.% of carbon dioxide is added.

5. The process of claim 1 wherein the carbon dioxide is added in the form of flue gas.

6. The process of claim 1 wherein said anionic polymer dispersant is a lignosulfonate, sodium formaldehyde sulfonate, acrylic polyelectrolyte or a salt thereof.

7. The process of claim 6 wherein said dispersant is an acrylic polymer polyelectrolyte having a molecular weight of about 500–50,000 or a salt thereof.

8. The process of claim 7 wherein said dispersant is an aqueous solution of a water soluble salt of polyacrylic acid having an average molecular weight of less than 2,000.

9. The process of claim 1 wherein a base is added to said slurry before said dispersant is added to said slurry.

10. The process of claim 9 wherein said base is caustic soda.

11. A carbon oxide treated pumpable kiln feed slurry useful in a wet process to produce Portland cement containing an anionic polymer dispersant.

12. The slurry of claim 11 having a viscosity of about 4,000–6,000 cps.

13. The slurry of claim 11 in which said dispersant is a lignosulfonate, sodium formaldehyde solfonate, acrylic polyelectrolyte or salt thereof.

14. The slurry of claim 13 wherein said dispersant is an acrylic polymer polyelectrolyte having an average molecular weight of about 500–50,000 or a salt thereof.

15. The slurry of claim 14 wherein said dispersant is a water soluble salt of polyacrylic acid having an average molecular weight of less than 2,000.

16. The slurry of claim 11 additionally containing a base.

17. The slurry of claim 16 wherein said base is caustic soda.

18. The process of claim 1 wherein said dispersant is added in amounts sufficient to reduce the viscosity of said slurry to about 2,000–12,000 cps.

19. The slurry of claim 11 having a viscosity of about 2,000–12,000 cps.

* * * * *